United States Patent
Mince et al.

[19]

[11] Patent Number: 5,815,471
[45] Date of Patent: Sep. 29, 1998

[54] METHOD AND APPARATUS FOR PREVIEWING AUDIO SELECTIONS

[75] Inventors: William L. Mince, Menlo Park; Daniel E. Kyte, San Francisco, both of Calif.

[73] Assignee: PICS Previews Inc., San Francisco, Calif.

[21] Appl. No.: 694,694

[22] Filed: Aug. 8, 1996

Related U.S. Application Data

[60] Provisional application No. 60/013,693 Mar, 19, 1996.

[51] Int. Cl.[6] ................................................... G11B 17/22
[52] U.S. Cl. ................................................................ 369/30
[58] Field of Search ................................ 369/30, 33, 32, 369/34, 36, 37, 38, 41, 178; 360/12, 6

[56] References Cited

U.S. PATENT DOCUMENTS

| | | | |
|---|---|---|---|
| 4,544,920 | 10/1985 | Hamlin | 360/12 |
| 4,899,331 | 2/1990 | Masaki et al. | 369/32 |
| 4,937,807 | 6/1990 | Weitz et al. | 369/85 |
| 4,949,322 | 8/1990 | Kimura et al. | 369/32 |
| 4,984,098 | 1/1991 | Buntsis | 360/12 |
| 5,051,973 | 9/1991 | Shiba et al. | 369/30 |
| 5,105,402 | 4/1992 | Ishii et al. | 369/33 |
| 5,263,199 | 11/1993 | Barnes et al. | 369/7 |
| 5,459,702 | 10/1995 | Greenspan | 359/25 |
| 5,467,326 | 11/1995 | Miyashita et al. | 369/30 |
| 5,483,506 | 1/1996 | Yoshioka et al. | 369/7 |
| 5,532,680 | 7/1996 | Ousborne | 360/12 |

*Primary Examiner*—Tan Dinh
*Attorney, Agent, or Firm*—Townsend and Townsend and Crew LLP

[57] ABSTRACT

An apparatus for previewing a plurality of audio selections is described. A digital storage medium in a memory drive stores the plurality of audio selections in a spiral track with open indexing. A configurable touchpad is provided for selecting one of the audio selections. Sound circuitry converts the audio selections to audio signals, and at least one audio speaker converts the audio signals to acoustic energy. A controller controls the operation of the memory drive, the touchpad, and the sound circuitry.

25 Claims, 2 Drawing Sheets

METHOD AND APPARATUS FOR PREVIEWING AUDIO SELECTIONS

RELATED APPLICATION DATA

The present application is a non-provisional utility patent application based on Provisional Patent Application No. 60/013,693, filed on Mar. 19, 1996, from which the present application claims priority.

BACKGROUND OF THE INVENTION

Current audio sampling systems use existing CD players in a variety of ways. Some allow the retailer to feature one album per unit while other use a disc changer and allow up to ten different albums. In these systems the retailer can change a featured album by loading a copy of the retail packaged CD. Other systems use premastered CD-ROMs which have only a few cuts from a variety of albums. Still others allow customers to select a retail packaged CD for preview which must be unwrapped and then rewrapped after preview. Each of these preview methods suffers from one or more disadvantages.

Preview systems which play tracks from one or more CDs are limited to the small number of CDs which may be loaded at one time. In addition, selection of a particular track on a particular disk is often followed by a delay in loading the selected disk and locating the selected track which may be irritating to customers who wish to quickly preview a number of different tracks from several selections. On the other hand, preview systems which employ premastered CD-ROMs do not provide the flexibility to preview any portion of any track on a particular CD because only small portions of a few preselected tracks are available to the user. Finally, the low tech preview method where packaged CDs are opened on an ad hoc basis presents obvious disadvantages to both the consumer and the retailer.

It is therefore desirable to provide a system and method for previewing audio selections which is fast, convenient, and comprehensive both in terms of the number of CD selections and the ability to preview individual tracks on each.

SUMMARY OF THE INVENTION

The present invention provides an audio sampling system which runs on software which provides the capability of quickly and conveniently previewing any track from a wide variety of CDs. The system uses a PC motherboard to play back audio selections stored in a modified "Red Book" format which is described below. The system software is supplied on a floppy disk, stored on a hard drive, or provided in some other medium such as, for example, an EPROM. The audio selections may be stored in a music CD, a CD-ROM, or a Digital Versatile Disk. The system allows a potential purchaser to listen to all of the tracks of a featured music album before purchasing. In addition, because the music album data is stored in a format with open indexing, access to the desired track from the desired album is sufficiently fast to satisfy the demands of even the most impatient consumer.

The music album is selected from a transparent touchpad which has pictures of album covers printed in color on paper behind the touchpad. The system allows a variable number of albums to be sampled because the touchpad is configurable to present different numbers of album selections. The compact size of the system allows it to be hung from a standard point-of-purchase display rack. In addition to music previews, audio commercials may be played in the system's attract mode or added as bumpers in front of selected music cuts.

According to the invention an apparatus for previewing a plurality of audio selections is described. The apparatus includes a memory drive for reading a digital storage medium having the audio selections stored in a spiral track with open indexing. A touchpad is provided for selecting one of the audio selections, the touchpad being configurable to select different numbers of the audio selections. Sound circuitry converts the audio selections to audio signals which are then converted to acoustic energy by at least one audio speaker coupled to the sound circuitry. A controller is coupled to and controls the operation of the memory drive, the touchpad, and the sound circuitry.

A method for previewing a plurality of audio selections is also described. A digital storage medium is provided for storing the plurality of audio selections in a spiral track with open indexing. A touchpad is configured to select a first number of the audio selections, the touchpad being configurable to select different numbers of the audio selections. A first audio selection is selected in response to a signal from the touchpad. The first audio selection is converted to audio signals. The audio signals are then converted to acoustic energy.

A further understanding of the nature and advantages of the present invention may be realized by reference to the remaining portions of the specification and the drawings.

DESCRIPTION OF SPECIFIC EMBODIMENTS

Figure 1:
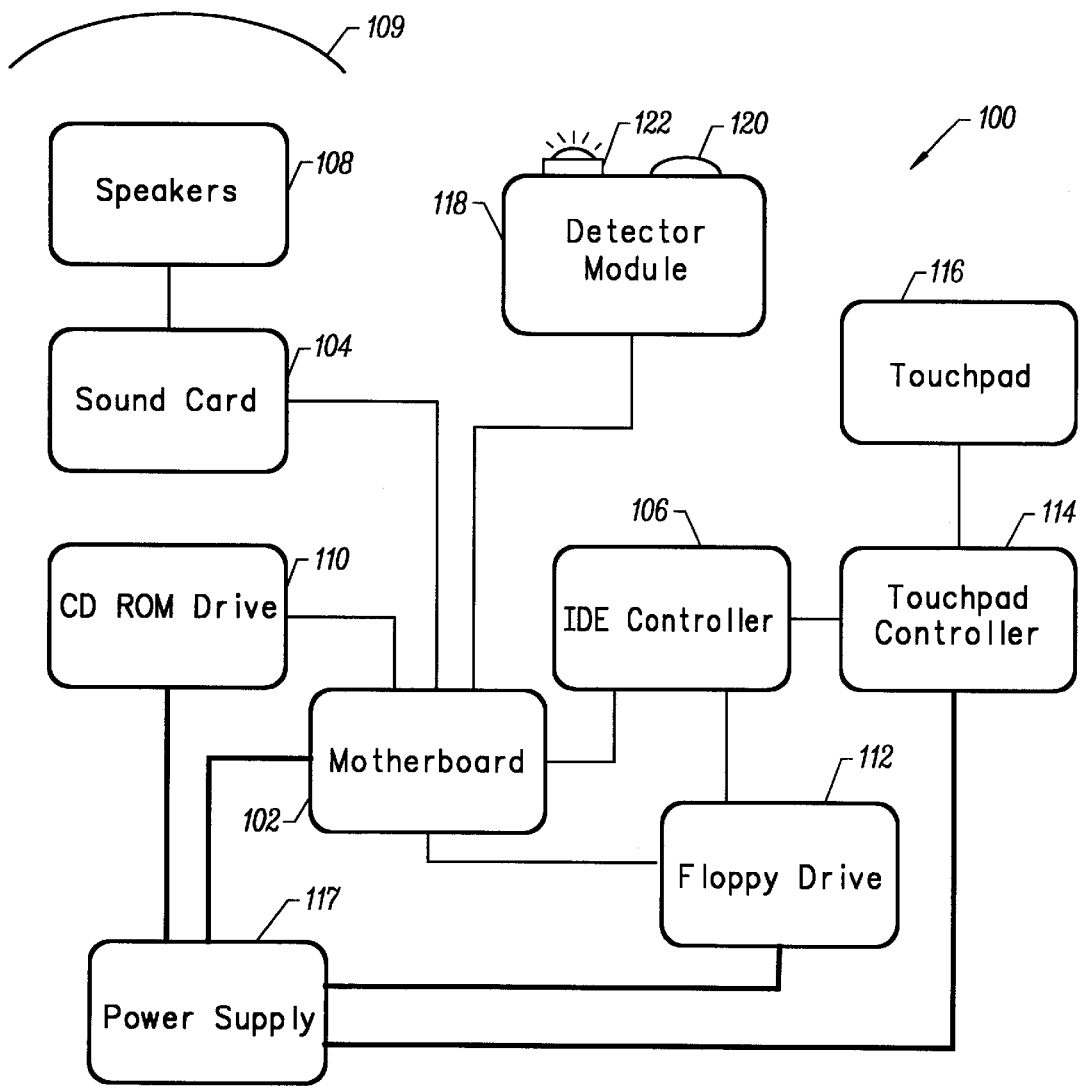
FIG. 1 is a block diagram of a specific embodiment of the invention.

FIG. 1 is a block diagram showing a hardware configuration of a specific embodiment of the invention. Audio sampling system 100 includes a motherboard 102 which controls a sound card 104 and an IDE controller 106. Sound card 104, which may be any of a variety of commercially available PC-compatible sound cards (e.g., the Sound-Blaster® card available from Creative Technologies, Inc.), drives speakers 108 which may be any of a variety of commercially available audio speakers. Alternatively, speakers 108 may comprise headphones for private previewing. According to one embodiment, speakers 108 are configured with a directional device 109 which directs the acoustic energy from speakers 108 such that a user must be located in a particular spot to hear the music well. With this embodiment, the user receives high fidelity sound without disturbing others.

Sound card 104 also communicates with disk drive 110 from which it receives audio selections. According to one embodiment, the audio selections are stored on a compact disc (CD) in a modified "Red Book" format with open indexing. The "Red Book" format is the standard CD music format. According to the present invention, each such CD has a single spiral of data beginning at the inside edge of the disk and ending at the outside edge. The data spiral is divided into frames, each of which contains 1/75th of a second of stereo music. Each frame is addressable by minute/second/frame. The data spiral is also divided into 99 addressable tracks, each of which may be further divided into 99 sub-tracks, providing a total of 9801 points in the spiral which may be indexed and accessed by the optical elements of disk drive 110. In the traditional "Red Book" format only the 99 tracks are addressable. The open indexing employed by the present invention indexes each of the 99 sub-tracks within each track, thus providing a much more flexible format in which a much larger number of individual music selections may be stored and accessed than with the traditional "Red Book" format.

A number of music selections are encoded in the data with the beginning of each being indexed at a particular one of the index points. A data section at the beginning of the data spiral cross references the index points and the minute/second/frame addresses which are hard coded in the data. The number of music selections on a single CD depends upon the lengths of the selections. Alternatively stated, the lengths of the selections depends upon the number of music selections it is desirable to store on one CD. A typical CD having audio data stored in the "Red Book" format currently has the capacity to store approximately 140 thirty second music selections. According to one embodiment, the music selections are stored in a monaural audio track, thereby substantially doubling the number of selections which may be stored on one CD. With this embodiment, the audio is switched at the output of the player.

According to another embodiment, the audio selections are stored in the form of digital *.WAV audio data files on, for example, a CD or a Digital Versatile Disk (DVD).

Disk drive 110, which is also controlled by motherboard 102, may comprise a CD-ROM drive, or, alternatively, a DVD drive for greater storage capacity. IDE controller 106 communicates with disk drive 112, which may comprise a floppy or hard disk drive, and touchpad controller 114 which controls touchpad 116. Disk drive 112 is also controlled by motherboard 102.

According to various embodiments, touchpad 116 allows a variable number of locations to be programmed for album selection and may comprise any of a variety of types of keypads employing resistive, capacitive, or surface acoustical wave technology. Touchpad 116 is clear so printed paper may be placed behind it illustrating the available selections. It will be understood that touchpad 116 may have a variety of different configurations in which, for example, the paper is placed over the touchpad, or the touchpad is backlit. As technology advances, it is anticipated that sound card 104, IDE controller 106 and the disk drive 112 may be integrated into motherboard 102. System 100 is powered by power supply 117.

According to specific embodiments, motherboard 102 may comprise any of a variety of commercially available personal computer (PC) motherboards. Alternatively, motherboard 102 may comprise a "stripped down" printed circuit board (PCB) having only the functionality necessary to implement the features of the invention. Such a PCB may include, for example, a microprocessor with its support ICs, i.e., an EPROM, RAM, an address decoder, and an IDE interface.

According to specific embodiments, keyboard interface circuitry is included in motherboard 102. Additionally, an audio amplifier may be included on motherboard 102 instead of having a separate sound card 104. In a specific embodiment, a level control circuit is added between the channel selector and the power amp sections of the audio amplifier. Service controls such as CD ejection circuitry and sound level adjustment may also be included. Other circuitry such as watchdog circuitry, various interface circuits, static electric discharge protection, and headphone connections may also be included. According to one embodiment, a separate power supply is provided for motherboard 102.

Audio sampling system 100 also includes a detector module 118. In one embodiment, detector module 118 periodically measures the ambient sound level using an electronic microphone 120. System 100 then uses this information to adjust the sound level of speakers 108. That is, if the ambient noise level is high, the sound level will be increased appropriately. Conversely, if the ambient noise level is low, the sound level will be decreased. In another specific embodiment, detector module 118 also includes an infrared sensor 122 which is used to determine if a user is approaching the system, at which point the sound level is increased. After a time period of programmable length, system 100 resets the sound level to a preset level to avoid playing selections at an increased sound level after the user has walked away. Alternatively, the system may reset the sound level to some preset level once it has reentered attract mode, or when the presence of the user is no longer detected.

Figure 2:
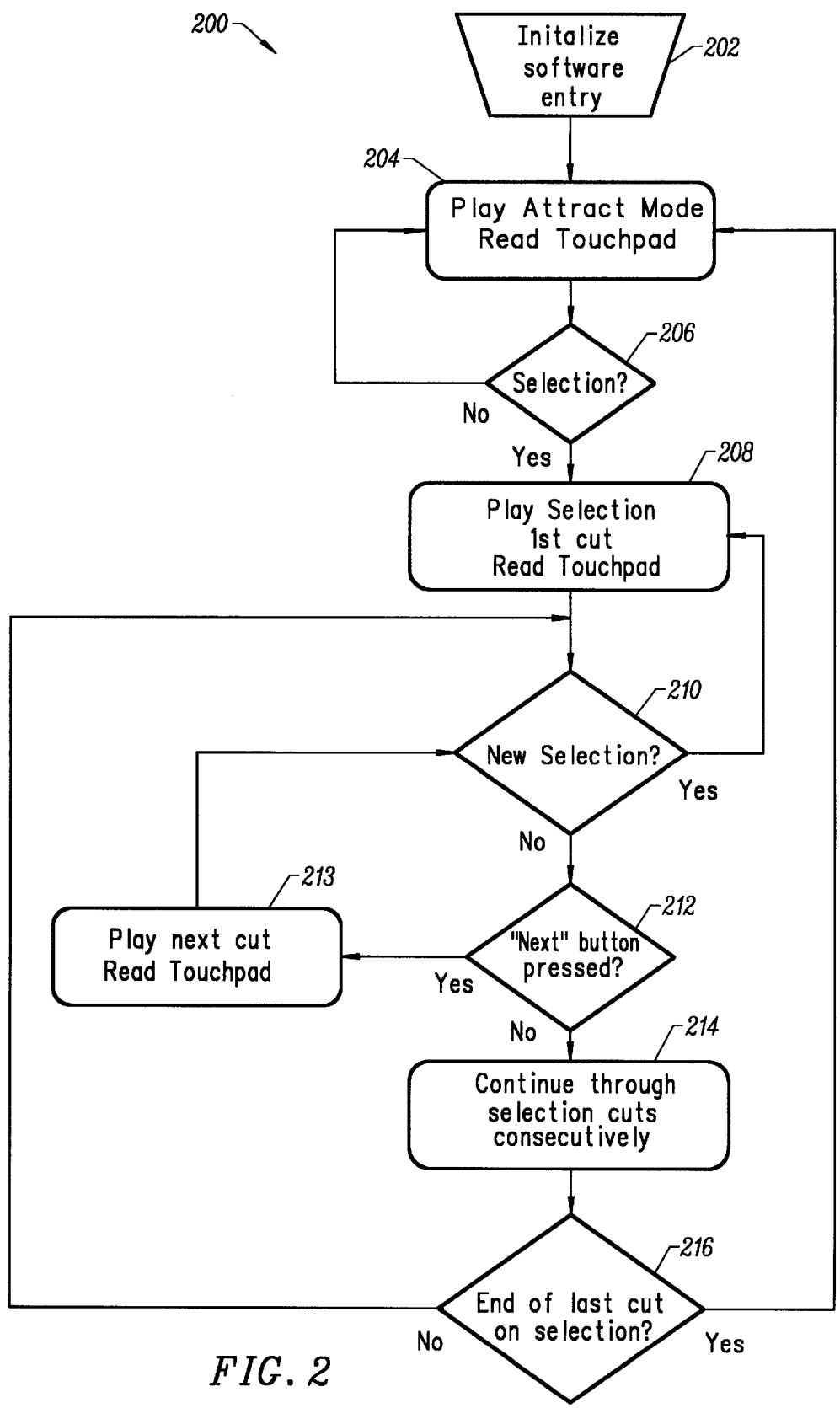
FIG. 2 is a flowchart describing operation of a specific embodiment of the invention.

FIG. 2 is a flowchart 200 describing operation of a specific embodiment of the invention. As system operation begins, the software is initialized (step 202). The system then begins to operate in its "attract" mode (step 204) during which a sequence of portions of audio selections and/or commercial messages are played. Throughout its operation, the system periodically scans the touchpad to determine if a selection has been made or a change has been requested by the user. If a selection has been made (step 206), the system begins playing the first track of the selected album (step 208). If a selection has not been made, the system continues in attract mode. If during playback of a particular audio selection a new selection has been made (step 210), the system begins playing the first track of the new selection. If the user presses the "Next" button (step 212), the system jumps to the next track in the current selection (step 213). Otherwise, the system continues consecutively through the tracks of the current selection (step 214) until the end of the last section is reached (step 216), at which point, the system re-enters attract mode.

It will be understood that a variety of additional features may be added to the system operation without departing from the scope of the invention. For example, options may be added for repeating a selection, backing up a step in the selection process, and controlling the sound level. In addition, the system may track customer selection data which it may then store in the floppy disk drive for inventory and other statistical purposes.

The various specific embodiments of the present invention allow for a significant amount of flexibility. For example, by modifying the software and reconfiguring the touchpad, the number of albums presented range from one to as many as can be physically displayed and accessed via the touchpad. Alternatively, an even greater number of selections may be made available using an alphanumeric keypad to designate selections from a list of selections. In addition, the length of the individual cuts and the storage capacity of the CD-ROM/DVD may be manipulated, thus providing additional flexibility.

While the invention has been particularly shown and described with reference to specific embodiments thereof, it will be understood by those skilled in the art that the foregoing and other changes in the form and details may be made therein without departing from the spirit or scope of the invention. The scope of the invention should therefore be determined by reference to the appended claims.

What is claimed is:

1. An apparatus for previewing a plurality of audio selections, comprising:

a memory drive for reading a first digital storage medium having the plurality of audio selections stored therein in a spiral track with open indexing, the spiral track with open indexing comprising a plurality of indexed tracks, the open indexing allowing accessing of sub-tracks within the indexed tracks;

a touchpad for selecting one of the audio selections;

sound circuitry for converting the audio selections to audio signals;

at least one audio speaker coupled to the sound circuitry for converting the audio signals to acoustic energy;

a controller coupled to and controlling the operation of the memory drive, the touchpad, and the sound circuitry.

2. The apparatus of claim 1 further comprising an ambient noise sensor for sensing ambient noise and generating a noise signal.

3. The apparatus of claim 2 wherein the sound circuitry manipulates a sound level of the acoustic energy in response to the noise signal.

4. The apparatus of claim 1 further comprising a sensor for sensing when a person is in proximity to the apparatus and generating a proximity signal.

5. The apparatus of claim 4 wherein the sound circuitry manipulates a sound level of the acoustic energy in response to the proximity signal.

6. The apparatus of claim 1 further comprising a second digital storage medium for storing system software for controlling operation of the system.

7. The apparatus of claim 1 wherein the memory drive comprises a CD-ROM drive and the first digital medium comprises a CD-ROM.

8. The apparatus of claim 1 wherein the memory drive comprises a Digital Versatile Disk drive and the first digital medium comprises a Digital Versatile Disk.

9. The apparatus of claim 1 wherein the touchpad is configured to select different numbers of the audio selections.

10. The apparatus of claim 1 wherein the sound circuitry comprises a sound card.

11. The apparatus of claim 1 wherein the at least one audio speaker comprises headphones.

12. The apparatus of claim 1 further comprising a PC motherboard comprising the controller.

13. The apparatus of claim 1 wherein the spiral track of audio selections is stored in a modified Red Book format.

14. The apparatus of claim 1 wherein the spiral track of audio selections comprise a plurality of *.WAV files.

15. A method for previewing a plurality of audio selections comprising the steps of:

providing a digital storage medium for storing the plurality of audio selections in a spiral track with open indexing, the spiral track with open indexing comprising a plurality of indexed tracks, the open indexing allowing accessing of sub-tracks within the indexed tracks;

selecting a first audio selection in response to a signal from a touchpad;

converting the first audio selection to audio signals; and converting the audio signals to acoustic energy.

16. The method of claim 15 further comprising the step of configuring the touchpad to select a first number of the audio selections, the touchpad being configurable to select different numbers of the audio selections.

17. The method of claim 15 wherein the acoustic energy is characterized by a sound level, the method further comprising the steps of:

sensing ambient noise and generating a noise signal indicative thereof; and manipulating the sound level in response to the noise signal.

18. The method of claim 15 wherein the acoustic energy is characterized by a sound level, the method further comprising the steps of:

sensing a proximity of a person and generating a proximity signal indicative thereof;

manipulating the sound level in response to the proximity signal.

19. The method of claim 18 further comprising the step of resetting the sound level to a preset value after a period of time.

20. The method of claim 18 further comprising the step of resetting the sound level to a preset value when the person is no longer present.

21. The apparatus of claim 1 wherein the ability of said first digital storage medium to store the plurality of audio selections enables the apparatus to be of a size that enables the apparatus to be attached to a standard point-of-purchase display rack.

22. An apparatus for previewing a plurality of audio selections, comprising:

a memory drive configured to read a first digital storage medium having the plurality of audio selections stored therein in a spiral track with open indexing, said open indexing providing 99 track addresses and 99 sub-track addresses per each one of said 99 track addresses;

a touchpad configured to permit the selection of one of the audio selections;

sound circuitry configured to convert the audio selections into audio signals;

at least one audio speaker coupled to the sound circuitry configured to convert the audio signals into acoustic energy;

a controller coupled to and controlling the operation of the memory drive, the touchpad, and the sound circuitry.

23. The apparatus of claim 22 wherein the ability of said first digital storage medium to store the plurality of audio selections enables the apparatus to be of a size that enables the apparatus to be attached to a standard point-of-purchase display rack.

24. An apparatus for previewing a plurality of audio selections, comprising:

a memory drive configured to read a first digital storage medium having the plurality of audio selections stored therein in a spiral track with open indexing, the spiral track with open indexing comprising a plurality of indexed tracks, the open indexing allowing accessing of sub-tracks within the indexed tracks;

a touchpad configured to permit the selection of one of the audio selections, said touchpad having a plurality of selections, each one of said plurality of selections corresponding to one of said sub-tracks;

sound circuitry configured to convert the audio selections into audio signals;

at least one audio speaker coupled to the sound circuitry configured to convert the audio signals into acoustic energy;

a controller coupled to and controlling the operation of the memory drive, the touchpad, and the sound circuitry.

25. The apparatus of claim 24 wherein the ability of said first digital storage medium to store the plurality of audio selections enables the apparatus to be of a size that enables the apparatus to be attached to a standard point-of-purchase display rack.

* * * * *